May 29, 1934.  T. L. E. HAUG  1,960,244
LOCK BOLT
Filed April 15, 1932
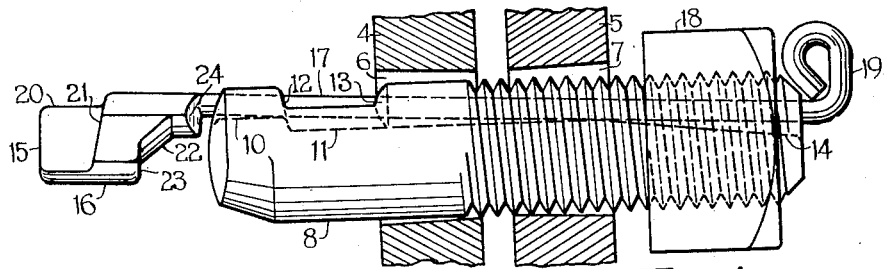
FIG. 1
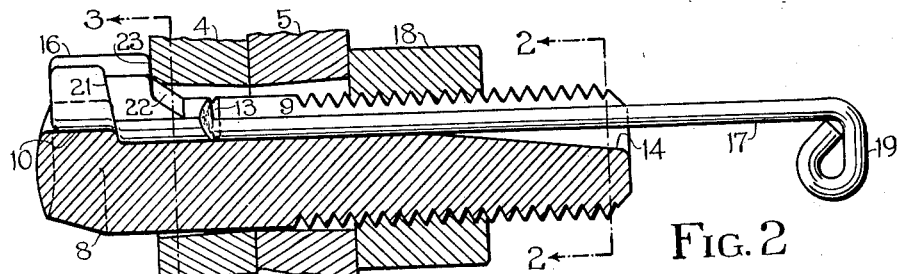
FIG. 2
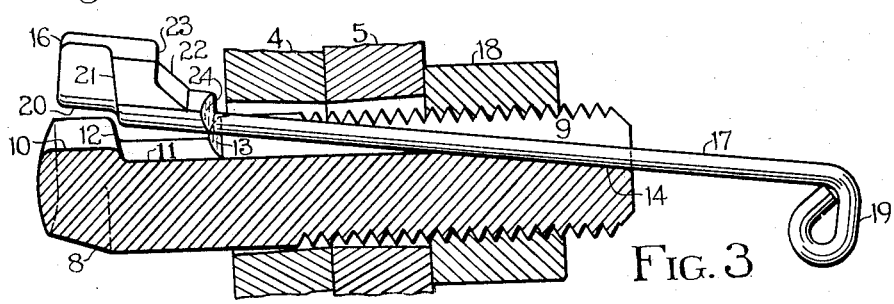
FIG. 3
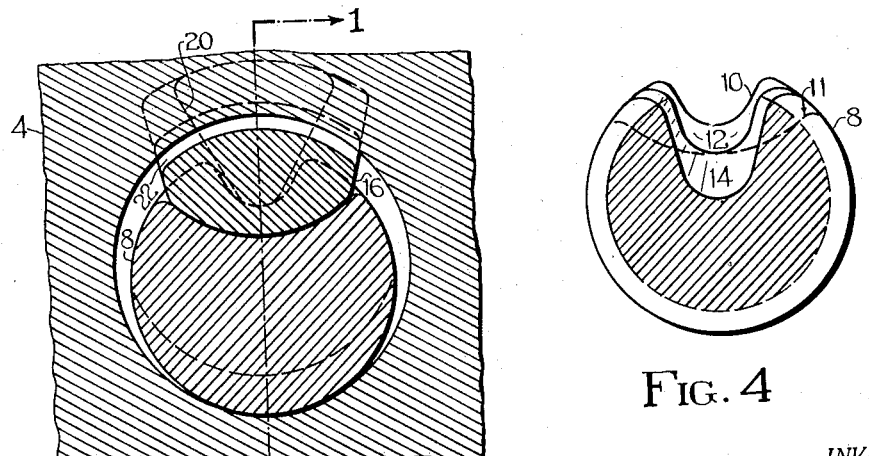
FIG. 4
FIG. 5
WITNESSES:
Robert C. Kennedy
INVENTOR.
Thaddeus L. E. Haug
BY
ATTORNEY.

Patented May 29, 1934

1,960,244

UNITED STATES PATENT OFFICE 1,960,244

LOCK BOLT

Thaddeus Leon Euclid Haug, Berkeley, Calif.

Application April 15, 1932, Serial No. 605,469

7 Claims. (Cl. 85—1)

This invention deals primarily with the temporary bolting together of structural metal parts, preparatory to their permanent joining by riveting or welding, and is especially adapted to plated structures wherein one side of the parts to be assembled is relatively inaccessible from the other side.

A form of bolt whereby access to only one side of the work is necessary to insert the bolt in registering holes of adjacent parts and fasten said bolt in place and whereby the bolt can be applied to the work or removed therefrom without separating said bolt from its nut, was described in my United States Letters Patent No. 1,404,955, granted January 31, 1922, entitled "Service bolt for fastening structural work".

In the preliminary assembly of structural parts, it is usually advisable to leave the first bolts somewhat slack, to permit of such subsequent slight adjustments in the relative positions of adjacent parts, as are necessary to best fit each part to all those surrounding. After the structure has been fully assembled and faired up, additional bolts are inserted and all drawn up tight.

The service bolt shown in the aforesaid United States Letters Patent No. 1,404,955 could not be left slack without danger of the bolt unlocking by the wedge slipping out of locking position. Thus, the advantages of the bolt could not usually be realized in the preliminary assembly work. Also, if parts should shift after bolting, matched holes might become offset under the head of the bolt and obstruct its removal.

A newer form of bolt, described in my United States Letters Patent No. 1,854,737 granted April 19, 1932, entitled "Bolt for assembling structures" includes a positively locked wedge and, by permitting the bolt to remain slightly slack in the locked position without danger of the wedge slipping out of place, also by furnishing a full size neck which prevents holes becoming offset under the head, makes said bolt practicable for preliminary assembly work.

However, this newer form of bolt still possesses disadvantages, of which one is the necessity of rotating the wedge member laterally into a recess of the bolt body after the wedge has been drawn toward the nut for locking purposes, said rotation involving an extra motion not required to lock the older form.

Another disadvantage is that there is no plane about which the bolt body is symmetrical, so that when it is attempted to hot forge the bodies in multiple tandem, the cooling that occurs between the removal from the roughing dies and the placement in the finishing dies will cause a lateral curvature in the string of forgings and thus impede the proper placement of said forgings in the finishing dies; also the lateral curvature due to non-uniform cooling after finish forging will impede the placement of said forgings in the trimming dies.

A third disadvantage is the difficulty of obtaining enough bearing area of the wedge member on the structural work to prevent undue sinkage of the wedge member into the work when under heavy pressure.

The purpose of this invention is to provide a lock-bolt having all the functional advantages of the bolt forms above referred to, without the disadvantages cited, and having certain other advantages and features, some of which, with the foregoing, will be set forth at length in the following description, where I shall outline that form of the invention which I have selected for illustration in the drawing accompanying and forming a part of the present specification.

In said drawing, I have shown one form of the construction of my invention, but it is to be understood that I do not limit myself to such form, since the invention as expressed in the claims may be embodied in a plurality of forms.

In the accompanying drawing:

Figure 1 shows a side elevation of the bolt as it appears when unlocked for insertion through matched holes in the structural parts to be fastened, or for removal of the bolt from said holes, the latter being shown in axial section.

Figure 2 shows a partial axial cross-section of the bolt as it appears when locked in place and fastening two structural members together, the cross-section being taken on plane 1—1 of Figure 5. The bolt body, nut, and holes are shown in section and the locking member in elevation.

Figure 3 shows a partial axial cross-section of the bolt as it appears with the locking member longitudinally tilted relatively to the bolt body axis, prior to unlocking the bolt or in the process thereof. The section is taken as in Figure 2, and the locking member shown in elevation as before.

Figure 4 shows a partial enlarged transverse cross-section of the bolt body, looking toward the locking end and taken on plane 2—2 of Figure 2. The other members are omitted for greater clarity.

Figure 5 shows an enlarged transverse cross-section of the bolt, looking toward the locking end thereof, and taken on plane 3—3 of Figure 2.

In the drawing, 4 and 5 are structural members to be fastened together by bolting through the registering holes 6 and 7, respectively.

The bolt body 8 is formed with an axial channel 9 of variable depth and width, having a stepped-up portion 10 at the head end of the bolt, a recessed and widened portion 11 adjoining 10 and forming on the bolt body an abutment 12 toward the head end and abutments 13 toward the threaded end, and a tapering bottom 14 near the threaded end, whereby the channel becomes gradually deeper as it approaches the end of the bolt. It is to be noted that abutments 12 and 13 extend on both sides of the channel proper.

The wedge member or locking member 15 comprises a wedge or locking element 16 attached to a stem 17 extending through nut 18, said stem being provided with a lug portion 19 whereby the locking member may be positioned by manipulation beyond the threaded end of the bolt body.

The wedge has a stepped-in portion 20, and an adjoining abutment 21 adapted to engage with abutment 12 of the bolt body. Wedge 16 has a wedging surface 22 and adjoining abutment 23, both adapted to engage with one of the structural members being fastened, in this case member 4.

At its toe, the wedge has abutments 24 on each side of the stem 17, adapted to contact with abutments 13 of the bolt body, when the wedge is drawn forward thereon.

To pass the bolt through registering holes of the structural parts to be fastened, it is collapsed by using lug 19 to place the wedge element beyond the head end of the bolt and rotate it to a position within the projection of the bolt surface, as in Figure 1.

To lock the bolt in place fastening parts 4 and 5 together, lug 19 is used to draw wedge 16 toward the nut 18. By pulling radially outward as well as axially on stem 17, while wedge 16 is rotatively positioned as shown in Figure 2, 16 will drop into recess 11 when it reaches a position opposite the same, and the toe abutments 24 will then engage body abutments 13, drawing the bolt assembly into its locked position against member 4, as shown in Figure 2.

Inspection of Figure 2 will show that the nut need not take up all the slack to maintain the bolt in locked position, and that the side of hole 6 prevents the wedge from rising out of recess 11 sufficiently to escape abutment 12, unless both body and wedge are backed out of hole 6 an appreciable amount.

To release the bolt from the work, the nut is backed off several threads and the body pushed into the hole, abutments 13 pushing the wedge away from hole 6 and permitting said wedge to be tilted out of recess 11 by a radially inward pressure on that portion of stem 17 which projects beyond the nut. This tilting is made possible by the inwardly sloping bottom 14 of channel 9, which is so designed as not to unduly diminish the torsional and tensile strength of the bolt body at points where the maximum stresses occur under the nut loading. When wedge 16 has been tilted out of recess 11 and clear of abutment 12 as shown in Figure 3, it may be pushed beyond the head end of the bolt and positioned for removal of the latter as shown in Figure 1.

From the drawing and the above description, it is obvious that the mode of operation permits the body to be designed for forging symmetrically about an axial plane bisecting the channel in said body.

There is no lateral rotation of the wedge into a body recess, after positioning the wedge opposite said recess, and as it is not necessary to provide clearance for said rotation, the width of the wedge and therefore its bearing area on the structural work, can be increased to the maximum permitted by the size of the hole, more than is possible with the form of bolt described in my United States Letters Patent No. 1,854,737 above referred to.

Exceptionally hard and strong steel is needed in both body and wedge, to minimize the necessary bearing area of abutment 12 and permit of a sufficient minimum cross-section of the bolt body.

Wedge abutment 23 should be designed to contact with the structural work after wedging surface 22 has slightly penetrated the side of the hole in a radial direction.

It is recommended, that in addition to tapering the threaded end of the bolt body as shown in the drawing, to facilitate placement of a new nut on the body when necessary, standard soft steel nuts being used so that the wear and tear comes on the nuts and not on the bolt body, the body be made with a short unthreaded parallel portion adjoining the coned end and shorter than the nut thickness.

Said parallel portion should be of slightly less than root of thread diameter and may be used to facilitate the operation of threading the bolt body.

An alternative form of bolt to accomplish the same purposes as the form above described, may dispense with slope 14 of the bottom of channel 9 and use instead a stem 17 made of spring steel made curved in the unsprung condition, so that wedge 16 will be sprung clear of recess 11 by stem action when the bolt is released. This form is intended to be covered by the claims hereto appended.

I claim:

1. A bolt comprising a body with an abutment mounted adjustably on one end thereof, an axial channel in said body extending past the adjustable abutment, said channel being widened on both sides throughout an intermediate portion of its length, whereby abutment surfaces transverse to the bolt body axis are formed in said body on both sides of said channel, and a locking member adapted to engage with said transverse abutment surfaces for bolt locking purposes and to move laterally clear of said abutment surfaces for bolt unlocking purposes.

2. A lock bolt comprising a body with an abutment mounted adjustably on one end thereof, an axial channel formed in said body and extending past the adjustable abutment, the bottom of said axial channel near said adjustable abutment sloping radially inward toward the bolt body axis as it approaches the end of the bolt body, and a locking member adapted to co-act with said body in fastening structural parts together.

3. A bolt comprising a body with an abutment mounted adjustably on one end thereof, an axial channel formed in said body and passing said adjustable abutment, a fixed abutment on the body near its opposite end, and a locking member slidable in said channel and laterally tiltable with reference to the bolt body axis, whereby said locking member may be made to engage with or to pass said fixed abutment, without lateral rotation of the locking member relatively to the bolt body.

4. A bolt comprising a body with an abutment mounted adjustably thereon, an axial channel in said body extending past said adjustable abutment, and a wedge slidable and laterally tiltable in said channel by means operable from the remote side of the adjustable abutment, said wedge having a portion of its base stepped in to form a transverse abutment on said base and having an additional transverse abutment surface on the same side as the wedging surface.

5. A bolt comprising a body with two abutments thereon, a locking member adapted to engage with one of said abutments and having an operating extension past the other abutment, and means operable to bodily move the locking member laterally and slide it longitudinally relatively to the bolt body.

6. A bolt comprising a body having a lateral recess near one end thereof, an abutment mounted adjustably on said body near the other end thereof, a locking member adapted to be locked in said recess against moving longitudinally of said bolt body, said locking member having an operating extension past said adjustable abutment, and means for bodily moving said locking member laterally of said bolt body out of said recess and sliding said locking member longitudinally of said bolt body.

7. A bolt comprising a body having a lateral recess therein, an abutment mounted adjustably on said body, a locking member adapted to be locked by end walls of said recess against moving longitudinally of said bolt body, said locking member having an operating extension past said adjustable abutment, and means for bodily moving said locking member laterally and longitudinally of said bolt body, whereby said locking member may be made to pass said end walls of said recess.

THADDEUS LEON EUCLID HAUG.